(12) United States Patent
Goodman, Jr.

(10) Patent No.: US 9,333,586 B2
(45) Date of Patent: May 10, 2016

(54) TEMPLATE DEVICES FOR CUTTING AND MARKING SHEET METAL

(71) Applicant: Donald L. Goodman, Jr., St. Joseph, MO (US)

(72) Inventor: Donald L. Goodman, Jr., St. Joseph, MO (US)

( * ) Notice: Subject to any disclaimer, the term of this patent is extended or adjusted under 35 U.S.C. 154(b) by 345 days.

(21) Appl. No.: 13/887,626

(22) Filed: May 6, 2013

(65) Prior Publication Data

US 2013/0240491 A1    Sep. 19, 2013

Related U.S. Application Data

(63) Continuation of application No. 12/630,428, filed on Dec. 3, 2009, now Pat. No. 8,450,636.

(51) Int. Cl.
 *B23K 10/00* (2006.01)
 *B23K 9/32* (2006.01)

(52) U.S. Cl.
 CPC . *B23K 9/32* (2013.01); *B23K 10/00* (2013.01); *Y10T 83/04* (2015.04); *Y10T 83/8878* (2015.04)

(58) Field of Classification Search
 CPC ............ B23K 9/32; B23K 10/00; H05H 1/26; H05H 1/32; H05H 1/34; H05H 1/36; H05H 1/38; Y10T 83/8878; Y10T 83/04
 USPC ............. 219/121.39, 121.45, 121.54, 121.56, 219/121.58, 121.48; 266/58, 64
 See application file for complete search history.

(56) References Cited

U.S. PATENT DOCUMENTS

| 2,935,936 | A | | 5/1960 | Woodring et al. |
| 3,417,979 | A | | 12/1968 | Edward |
| 4,538,354 | A | | 9/1985 | Smolik |
| 4,593,887 | A | | 6/1986 | Peterson |
| 5,000,688 | A | * | 3/1991 | Clamp ......................... 434/164 |
| 5,653,895 | A | | 8/1997 | Shintani |
| 5,886,314 | A | * | 3/1999 | Sims ........................ 219/121.44 |
| 8,296,959 | B1 | * | 10/2012 | Brooks ......................... 33/21.3 |
| 2003/0168786 | A1 | * | 9/2003 | Pasulka ......................... 266/58 |
| 2006/0176582 | A1 | | 8/2006 | Amron |

OTHER PUBLICATIONS

Video showing a date of Dec. 3, 2008, showing the second prototype in use, which Applicant Donald Goodman, sent a link to the video, http://www.youtube.com/watch?v=nUY6ms4Sbo8, to a potential customer.

* cited by examiner

*Primary Examiner* — Mark Paschall
(74) *Attorney, Agent, or Firm* — K&L Gates, LLP; Louis Cullman; Brent A. Johnson (57) ABSTRACT

The embodiments disclosed herein provide a device suitable for assisting cutting and/or marking metal, such as sheet metal, comprising a template member, and optionally, an attachment component such as a magnetic component. The template member may further comprises a solid substrate material or a solid component and an outer edge and/or a window component. The device is configured so that the magnetic component allows the template member to be affixed to a metal object so that the outer edge and/or the window component may be used as a guide for cutting the metal, and allows the component to be removed from the metal when it is no longer needed for cutting.

20 Claims, 7 Drawing Sheets

TEMPLATE DEVICES FOR CUTTING AND MARKING SHEET METAL

CROSS-REFERENCE TO RELATED APPLICATIONS

This application is a continuation of U.S. patent application Ser. No. 12/630,428, filed Dec. 3, 2009, which is incorporated by reference herein in its entirety.

BACKGROUND OF THE INVENTION

1. Field of the Invention

The embodiments described herein relate to templates which may be useful in cutting sheet metal and objects made from sheet metal.

2. Description of the Related Art

Traditionally, many devices have been used to cut sheet metal, such as various saws or sheering devices. For heating, ventilation, and air conditioning (HVAC) applications, there has been an ongoing need for a quicker and cleaner method of cutting openings in warm air pipes, which are made from sheet metal, to install retrofit dampers. Recently, plasma cutters have become more affordable, and are being used more frequently by individuals for cutting sheet metal. Conventionally, the incisions made by plasma cutters were controlled by expensive equipment. However, as plasma cutters have become more commonplace and affordable, there is a need for an inexpensive template device to assist in cutting sheet metal in applications such as HVAC.

SUMMARY OF THE INVENTION

The embodiments disclosed herein provide a device suitable for assisting cutting and/or marking metal, such as sheet metal, comprising a template member which may be affixed or attached to a surface of the metal. Some embodiments may further comprise a template member and a magnetic component. The template member may further comprise a solid substrate material or a solid component and an outer edge and/or a window component. The device may be configured so that the magnetic component allows the template member to be affixed to a metal object so that the outer edge and/or the boundary of the window component may be used as a guide for cutting the metal, and allows the component to be removed from the metal when it is no longer needed for cutting.

Some embodiments provide a device suitable for assisting the cutting of metal, such as sheet metal, comprising: a template member comprising a solid substrate material having an outer edge; and a magnetic component, coupled to the template member; wherein the device is configured so that the outer edge may be used as a guide for cutting or marking metal, such as sheet metal, with a plasma cutter. In some embodiments, the device is configured so that the magnetic component provides a magnetic field of sufficient strength to allow the template member to be attached to the metal so that the outer edge may be effectively used as a guide for cutting or marking the metal with a plasma cutter. In some embodiments, the device is further configured so that the magnetic component provides a field which is sufficiently weak to allow the device to be effectively removed from the metal without substantially damaging the template member or the metal.

Some embodiments provide a device suitable for assisting the cutting of metal, such as sheet metal, comprising: a template member comprising a solid substrate material; a window component of the template member, comprising a pattern characterized by an area devoid of the solid substrate material, and a boundary around the area defined by the solid substrate material of the template member; a magnetic component, coupled to the template member; and at least three spacing members, configured to contact the metal, such as sheet metal, and coupled to the template member; wherein the device is configured so that the boundary of the window component may be used as a guide for cutting or marking metal, such as sheet metal, with a plasma cutter. In some embodiments, the device is configured so that the magnetic component provides a magnetic field of sufficient strength to allow the template member to be attached to the metal so that the boundary of the window component may be effectively used as a guide for cutting the metal, such as sheet metal, with a plasma cutter. In some embodiments, the device is further configured so that the magnetic component provides a field which is sufficiently weak to allow the device to be effectively removed from the metal without substantially damaging the template member or the metal; and wherein the device is configured so that the spacing members have a thickness such that, when all spacing members are disposed between and make contact with both the template member and the sheet metal, the resulting space between the template member and the sheet metal is effective to reduce a loss of force of the attachment between the template member and the metal caused by a mismatch between a contour of the surface of the metal and a contour of a surface of the template.

Some embodiments provide a method of cutting metal, such as sheet metal, comprising: providing a device disclosed herein; affixing the device to the metal, wherein the spacing members contact the metal; cutting the metal using a plasma cutter using the outer edge and/or the boundary of the window component as a guide for the plasma cutter; and removing the device from the metal.

Some embodiments provide a method of cutting metal, such as sheet metal, comprising: affixing a device to the metal, wherein the device comprises: a template member comprising a solid component and a window component; and a magnetic component, coupled to the template member; wherein the window component comprises a pattern characterized by an area devoid of the solid component, and a boundary around the area defined by the solid component of the template member; cutting the metal, such as sheet metal, using a plasma cutter, and using the boundary of the window component as a guide for the plasma cutter and removing the device from the sheet metal.

DETAILED DESCRIPTION OF THE PREFERRED EMBODIMENT

Some embodiments provide a device comprising a template member comprising a solid component and an outer edge and/or a window component, and a magnetic component, coupled to the template member. These devices are generally useful for assisting the cutting and marking of metals, such as sheet metal.

The template member may comprise a solid component and an outer edge and/or a window component. In some embodiments, the solid component may comprise any solid substrate material, such as a metallic material, including aluminum, tin, iron, magnesium, zinc, titanium, copper, etc., or a combination or an oxide thereof; a polymeric material such as a polyalkylene (such as polyethylene, polypropylene, etc.), an acrylate (such as polyacrylic acid, polymethyl methacrylate, polymethyl acrylate, etc.), an epoxy, a fluorocarbon (such as polytetrafluoroethylene, polyvinylidine difluoride, etc.), a functionalized vinyl polymer (such as polyvinyl chloride, also referred to as PVC, polyvinyl acetate, polyvinyl alcohol, etc.), and the like; or another solid material such as a ceramic, a cellulosic material such as a wood, etc; or a combination of one or more of the above. In some embodiments, the solid substrate material comprises PVC. Depending upon the type of solid material and the thickness of the template material, the template member may be flexible, rigid, or somewhere in between. The template member may be flat, curved, or have any other contour which may allow it to conform to the shape of the surface being cut or marked. In some embodiments, the template member is curved to conform to a cylindrical pipe or duct, such as a cylindrical pipe or duct having a diameter of about 4 inches, about 5 inches, about 6 inches, about 7 inches, about 8 inches, about 9 inches, about 10 inches, about 12 inches, about 14 inches, about 16 inches, about 18 inches, about 20 inches, or a range bounded by two of these values such as about 4-20 inches, about 5-18 inches, etc. Thus, the template member may have a radius of curvature of about 2 inches, about 2.5 inches, about 3 inches, about 3.5 inches, about 4 inches, about 4.5 inches, about 5 inches, about 6 inches, about 7 inches, about 8 inches, about 9 inches, about 10 inches, or a range bounded by two of these values such as about 2-10 inches, about 2.5-9 inches, etc. In some embodiments, the template member may be sufficiently flexible to deform as needed to conform to the contour of the surface of the sheet metal being cut.

The template member should be thin enough to be useful as a guide for a cutting device such as a plasma cutter. In some embodiments, the thickness of the template member is substantially smaller than the length and width of the template. In some embodiments, the template member has a thickness of about $\frac{1}{16}$ inch to about $\frac{1}{2}$ inch, about $\frac{1}{16}$ to about $\frac{1}{4}$ inch, or about $\frac{1}{8}$ inch. In some embodiments, a surface of the solid component orthogonal to the direction of the thickness (e.g. the area formed by the length and width dimensions) has an area of from about 0.1 square inches to about 100 square feet, about 1 square inch to about 32 square feet or about 40 square feet, about 1 square inch to about 1000 square inches, about 1 square inch to about 200 square inches, or about 2 square inches to about 50 square inches.

The window component of the template member comprises a pattern characterized by an area devoid of the solid substrate material or the solid component, and a boundary around the area defined by the solid substrate material or the solid component of the template member. Generally, the window component may be coplanar with the solid portion of the template member, or orthogonal to the direction of the thickness. The pattern may be any shape, such as a polygon, including a regular or irregular polygon (e.g. having sides which are not equal in length) such as a triangle, rectangle, square, pentagon, hexagon, heptagon, octagon, etc.; an ellipse such as an oval or a circle; or any other shape which may be cut out of a solid substrate. In some embodiments, the pattern is approximately circular with a diameter of about 4 inches, about 5 inches, about 6 inches, about 7 inches, about 8 inches, about 9 inches, about 10 inches, about 12 inches, about 14 inches, about 16 inches, about 18 inches, about 20 inches, or a range bounded by two of these values such as about 4-20 inches, about 5-18 inches, etc. In some embodiments, the pattern is approximately a triangle with each side having a length of about 2 inches, about 3 inches, about 4 inches, about 5 inches, about 6 inches, about 7 inches, about 8 inches, about 9 inches, about 10 inches, about 12 inches, about 14 inches, about 16 inches, about 18 inches, about 20 inches, or a range bounded by two of these values such as about 2-20 inches, about 3-18 inches, etc. In some embodiments, the pattern is approximately a rectangle or square with each side having a length of about 2 inches, about 3 inches, about 4 inches, about 5 inches, about 6 inches, about 7 inches, about 8 inches, about 9 inches, about 10 inches, about 12 inches, about 14 inches, about 16 inches, about 18 inches, about 20 inches, or a range bounded by two of these values such as about 2-20 inches, about 3-18 inches, etc. The area and the boundary of the window component should be configured so that the boundary may be useful as a guide for a cutting device such as a plasma cutter.

While the device may be held in place manually or by an external device for cutting, in some embodiments, an attachment component may be provided which may help to secure the device to the metal for easier cutting or marking or otherwise facilitate the cutting or marking process. For example, in some embodiments a magnetic component may be coupled to the template member which provides a magnetic field of sufficient strength to allow the template member to be attached to the sheet metal, so that the outer edge of the template member and/or the boundary of the window component may be effectively used as a guide for cutting or marking the sheet metal with a cutting device such as a plasma cutter. In some embodiments, magnetic field may also be sufficiently weak to allow the device to be effectively removed from the sheet metal without substantially damaging the template member or the sheet metal. In some embodiments, the magnetic field or the magnetic component has a pull force of about 1 pounds to about 200 pounds, about 10 pounds to about 100 pounds, about 20 pounds to about 80 pounds, or about 40 pounds to about 60 pounds.

Figure 1:
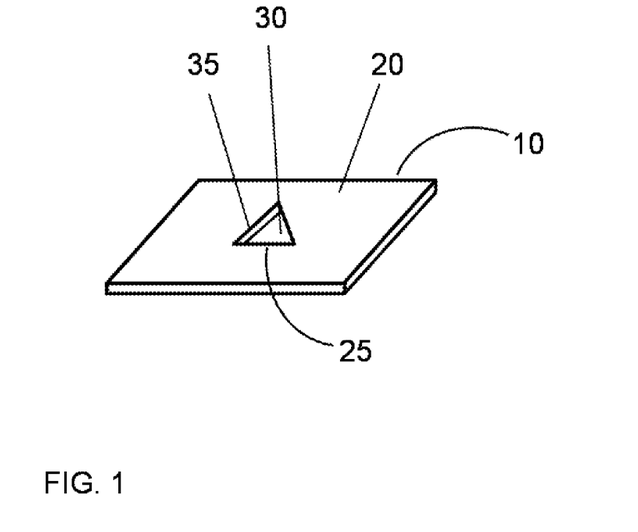
FIG. 1 is a depiction of an embodiment of the device described herein.

The magnetic component may take many forms. In most embodiments, it is coupled to the template member. For example, the solid component or the solid substrate material may be magnetic or magnetized. An example of a device comprising this type of template is depicted in FIG. 1. The device comprises template member 10 comprising a solid component 20 or solid substrate material and a window component 25, shown in this embodiment as a triangle shape. The window component comprises a pattern, which is a triangle shape in this embodiment, characterized by an area 30 which is devoid of the solid component and a boundary 35 around the area defined by the solid component 20.

In some embodiments, the template comprises a flexible solid magnetic material, similar to a refrigerator magnet or similar magnetic device, that can conform to the surface of the sheet metal. In some embodiments, the magnetic component comprises at least 1 solid magnet, at least 3 solid magnets, about 3 to about 200 solid magnets, about 3 to about 25 solid magnets, or about 4 to about 12 solid magnets. In some embodiments, each solid magnet may have a pull force in the range of about 1 pound to about 25 pounds, about 3 pounds to about 10 pounds, or about 6 pounds to about 7 pounds. In some embodiments, the solid magnets may be neodymium magnets, such as 1/4 inch by 1/4 inch cylindrical neodymium magnets available from Applied Magnets, Plano, Tex.

In some embodiments, the device may further comprise a spacing component which may comprise 1 or more, or at least 3, spacing members. The spacing component or spacing members are configured to contact the sheet metal and are coupled to the template member. In some embodiments, the spacing members have a thickness such that, when all spacing members are disposed between and make contact with both the template member and the sheet metal, the resulting space between the template member and the sheet metal is effective to reduce a loss of force of the attachment between the template member and the sheet metal caused by a mismatch between a contour of the sheet metal and a contour of the template. In some embodiments, the device may comprise the template member and the spacing component without an attachment component.

In some embodiments, the solid magnets may contribute to both the magnetic component and the spacing component or the spacing members. For example, in some embodiments, the magnetic component may comprise at least 3 solid magnets. A portion of each of at least 3 of the solid magnets are partially embedded into the template member at a single surface and partially protrude from that surface. The portion of the solid magnets protrude from the surface act as at least a portion of at least some of the spacing members. In other words, at least some of the spacing members comprise the portion of each magnet which protrudes from the surface of the template member.

Figure 2A:
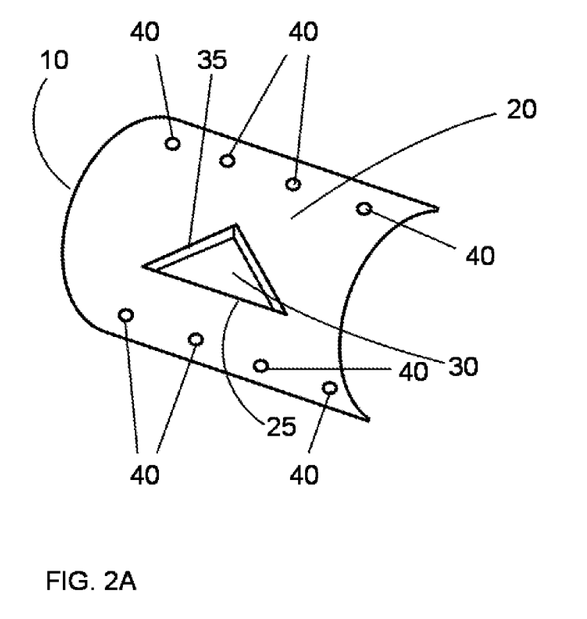
FIGS. 2A and 2B are a top view and a side view of an embodiment of the device described herein comprising solid magnets and spacing members.
Figure 2B:
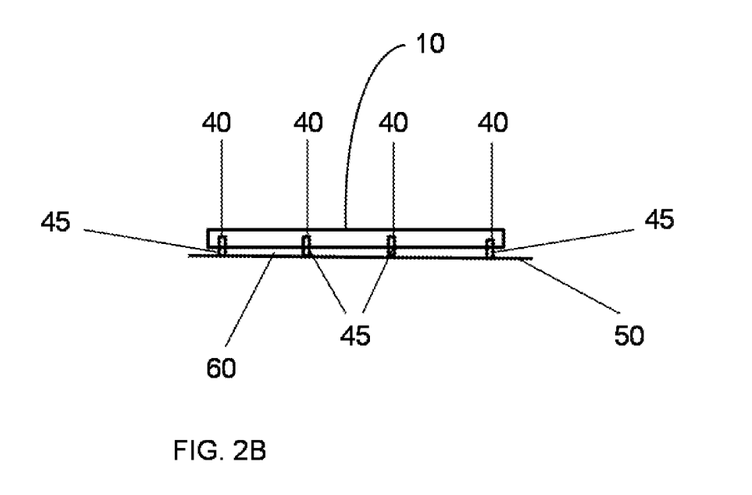

FIG. 2A is a top view of an embodiment of a device comprising solid magnets. The template member 10 has a curved contour which allows it to conform to a cylindrical pipe or duct. The window component 25, shown in this embodiment as a triangle shape, is characterized by an area 30 which is devoid of the solid component and a boundary 35 around the area defined by the solid component 20. The magnetic component comprises 8 solid magnets 40. FIG. 2B is a side view of the same device affixed to the metal surface for cutting a metal surface 50. The solid magnets 40 are partially embedded in the solid component 20 and partially protrude from the surface 15 of the solid component which faces the metal surface 50. The spacing component or spacing members 45 are formed by the protruding portions of the solid magnets 40. Thus, the template member 10 is affixed to the metal surface 50 by the solid magnets 40, which also provide a space 60 between the surface 15 of the solid component and the metal surface 50. In some embodiments related to FIG. 2B, the solid component of the template member is 1/8 inch PVC sheeting or pipe. In some embodiments related to FIG. 2B, the solid magnets are 1/4 inch by 1/4 inch cylindrical neodymium magnets.

In some embodiments, the spacing members have a thickness such that when disposed between the template member and the sheet metal, the gap between the template member and the sheet metal is effective to reduce damage to the template member which would otherwise be caused by cutting the sheet metal with a plasma torch.

Figure 3:
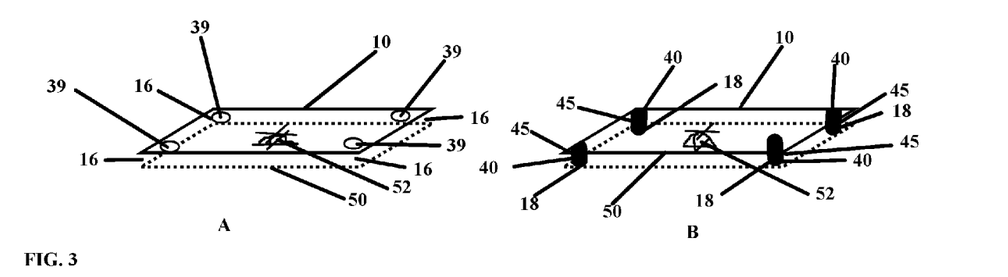
FIGS. 3A and 3B are partial depictions of an embodiment without (3A) and with (3B) a spacing component, which illustrate some potential advantages of the spacing component.

FIG. 3 illustrates how, in some embodiments, the space between the template member and the sheet metal may be effective to reduce a loss of force of the attachment between the template member and the sheet metal caused by a mismatch between a contour of the sheet metal and a contour of the template. In these embodiments, the window component is omitted for purposes of clarity, but it may be present in an actual device. FIG. 3A depicts a template member 10 and the metal surface 50 of an embodiment with four magnetic components 39, but no spacing component. The mismatch 52 in the contour of the metal surface 50 and the template member 10, causes gaps 16 between the magnetic components and the surface. The template might be tilted to allow contact of one or two of the magnetic components 39, but the contact is not possible with all four magnetic components. Thus, the mismatch 52 causes a loss of force of the attachment between the template member and the sheet metal because of the incomplete contact. By contrast, FIG. 3B depicts a template FIG. 3A depicts a template member 10 and the metal surface 50 of an embodiment, having 4 bar magnets that also act as spacing components 45. Despite the fact that the mismatch 52 in the contour of the metal surface 50 and the template member 10 is also present, all four magnetic components 40 in the form of bar magnets are able to make contact 18 with the metal surface 50 because the magnetic components also act as spacing components 45.

In some embodiments, the spacing components are sufficiently thick that the depths of mismatches in the contours of the surfaces are insignificant. For example, the thickness of the spacing component could be at least about 2 to about 10,000, about 5 to about 1000, or about 10 to about 500 times the depth of the largest mismatch. For example, in some embodiments the thickness of the spacing component or the spacing members is in a range of about 1/32 inches to about 1 inch, about 1/16 inches to about 1/4 inch, or about 1/8 inch.

The devices described herein may be used to assist in cutting sheet metal. While these may be useful with any type of cutting or marking device such as a laser cutter, a router, a mill, an oxy & fuel cutting torch, a reciprocating saw, a jig saw, a dremel type rotary tool, hand or power snips or shears, engraving tools, marking by use of pencil, pen, felt tip pen or marker, a paint marker, a wax pencil, a soap stone, a spray paint, an adhesive, carbon paper, etc., they are particularly useful with a plasma cutter. These devices, such as those depicted in FIGS. 1 and 2, may be used when cutting sheet metal as follows. The device is affixed to the sheet metal. If there are spacing members or a spacing component, the spacing members or spacing component 45 contact the sheet metal, such as the surface 50 of the sheet metal, as depicted in FIG. 2. The sheet metal is cut or marked using the cutting device such as a plasma cutter, wherein the boundary of the window component 35 is used as a guide for the plasma cutter. The device may be removed from the sheet metal when cutting is complete or when the device is no longer needed to complete the cutting. In some embodiments, cutting may not be complete, for example, the pattern may be etched sufficiently deeply into the metal that the template may be removed and the portion of the metal to be removed may be punched out.

While not limiting any embodiment by theory, it is believed that the magnetic component and the spacing components may help to protect the solid component or the solid substrate material from the plasma created by a plasma cutter when the plasma cutter is being used to cut a metal. A plasma cutter has a negative electrode. It is believed that the field created by the electrode causes the metal surface to take a positive charge. This is believed to cause a spark between the negative electrode and the metal surface. At the same time, cutting gas flow is created between the electrode and the metal. The spark creates a plasma from the cutting gas. Plasma is the fourth state of matter, which comprises partially ionized gas comprising ions, electrons, atoms, and molecules. Thus, it is believed that the ions and electrons of the plasma create an electric current between the negative electrode and the positive metal surface. This current causes the plasma to reach temperatures of about 30,000° F. in the immediate vicinity of the current. It is known that a magnetic field creates a sideway force on an electric current, according to equation 1:

$$F_B = qvB\sin\phi \quad (1)$$

In equation 1, $F_B$ is the magnetic deflecting force, q is the charge of the particle, q is the charge of the particle v is the velocity vector, B is the magnetic field vector, and $\phi$ is the angle between the velocity vector (v) and the magnetic field vector (B).

For a stationary magnet, the magnetic field has an arc shape, going perpendicular with respect to the north-south (N-S) polar axis of the magnet away from the north pole in areas near the north pole, then turning toward the direction of the N-S axis until it is parallel to the N-S axis in areas equidistant from the two axes, and turning perpendicular to the N-S axis toward the south pole in areas near the south pole. A magnetic field only exerts a sideway force on a current if the current is not perpendicular to the magnetic field. Thus, it is believed that since cutting will generally occur at the metal surface, e.g. near a pole, the magnetic field will create a sideway force on the plasma cutter current away from the solid component or solid substrate material. By directing the current away from the solid component, the magnetic field thus directs the hot plasma away from the solid component or solid substrate material. Thus, it is believed that the magnetic field may help to protect solid component or the solid substrate material. It is also believed that using solid magnets as the spacing component further protects the solid component because the increased space is filled with the magnetic field created by the solid magnets.

Figure 4:
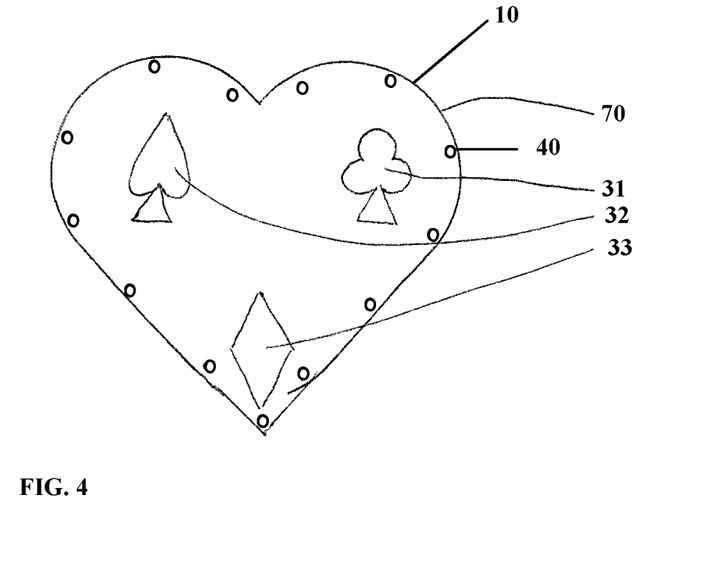
FIG. 4 is a top view of an embodiment of a device comprising more than one window component and an outer edge.

FIG. 4 is a top view of an embodiment of another device comprising solid magnets. This embodiment comprises three different window components 31-33, having different shapes. One or all of the window components 31-33 may be used as a guide for cutting, depending upon the particular need. In some embodiments, the template may have an outer edge 70, which may also be used as a guide for cutting the sheet metal. For example, this may be useful when the metal which is cut out of the metal sheet is of interest, such as when a decorative metal shape is desired.

Figure 5:
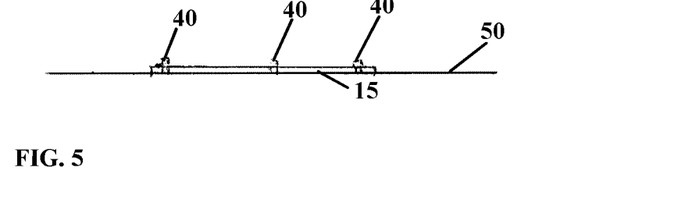
FIG. 5 is a side view of an embodiment of a device comprising solid magnets.

FIG. 5 is a side view of an embodiment of another device comprising solid magnets 40, wherein the surface 15 of the solid component directly contacts the metal surface 50, so that there is no spacing component.

Figure 6:
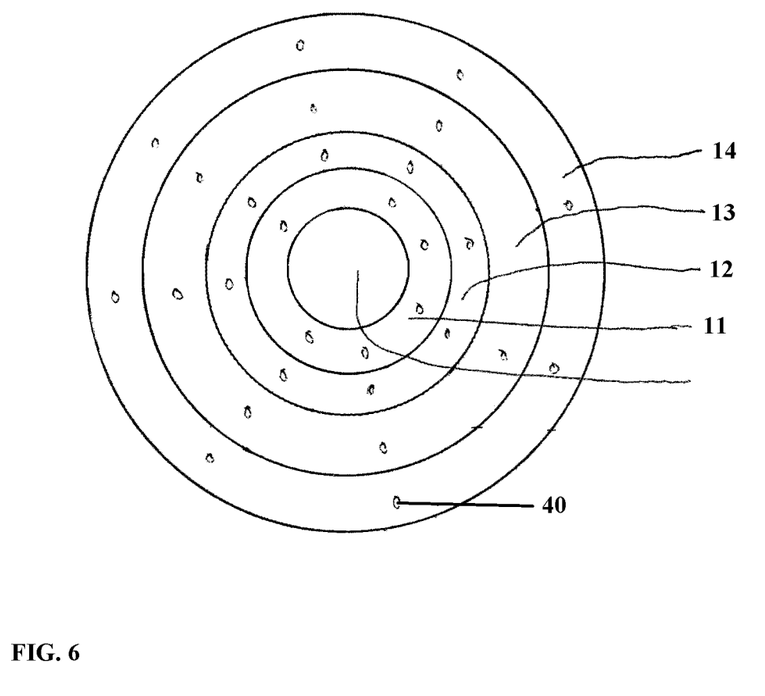
FIG. 6 is a top view of an embodiment of a device wherein the template member comprises several concentric rings.

FIG. 6 is a top view of an embodiment of another device comprising solid magnets 40. In this device, the template member 10 comprises several concentric rings 11, 12, 13, and 14. All or any combination of concentric rings 11, 12, 13, and 14 may be used to vary the size of the outer edge and/or window component, or to provide more than one outer edge and/or window component. In this manner, this device may be used to assist in cutting a large variety of patterns in a metal surface. A similar repeating geometry could be used with any other shape such as a triangle, a square, a rectangle, a polygon, or any other shape.

Figure 7:
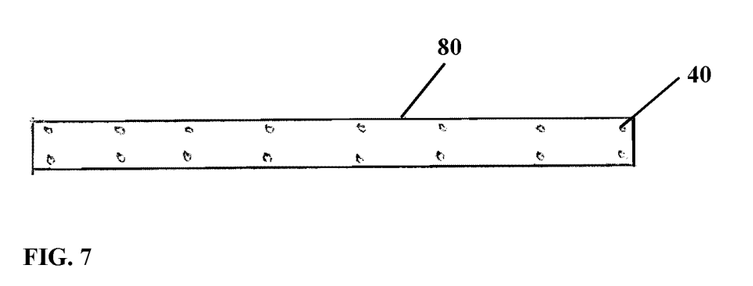
FIG. 7 is a top view of an embodiment of a device comprising an outer edge.
Figure 8:
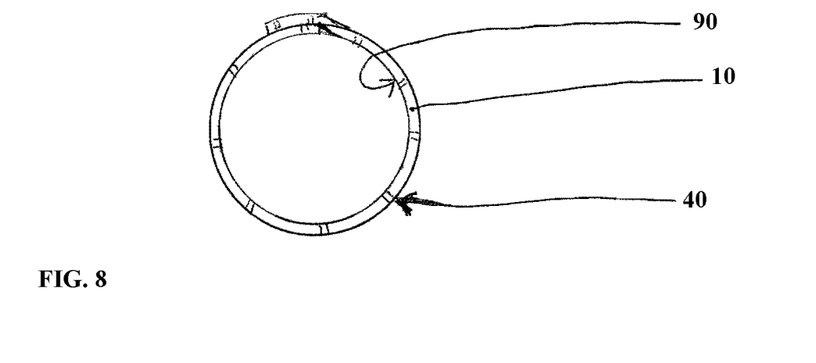
FIG. 8 is a cross-section an embodiment of a device comprising an outer edge.

FIG. 7 is a top view of an embodiment of a device comprising a magnetic component in the form of solid magnets 40 and an outer edge 80 which may be used as a guide for cutting sheet metal with a plasma cutter. FIG. 7 is a cross-section an embodiment of the device of FIG. 6. In this embodiment, the template member 10, comprising a flexible PVC strip is wrapped around a metal pipe 90. The outer edge 80, is the planar ring of the template member 10, which is depicted in FIG. 8, and the pipe 90 extends out of the page perpendicular to the plane of the page. Thus, the outer edge 80 may be used as a guide for cutting the pipe.

Figure 9:
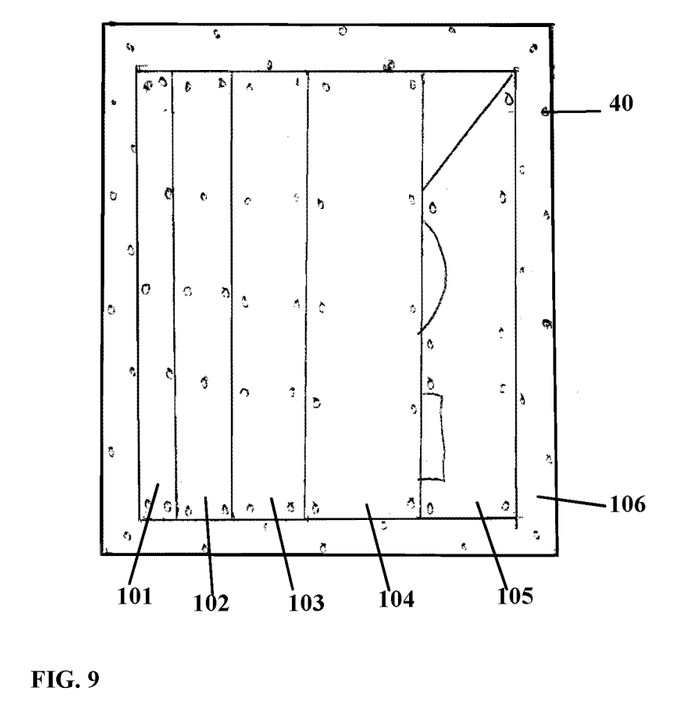
FIG. 9 depicts an embodiment wherein the template member comprises several pieces.

FIG. 9 depicts an embodiment wherein the template member comprises several pieces 101, 102, 103, 104, 105, and 106. In some embodiments, the magnetic component may comprise a number of solid magnets 40. Any combination of these pieces may be used to vary the outer edge and or the window component to assist in cutting of any of a number of different shapes in sheet metal.

Figure 10:
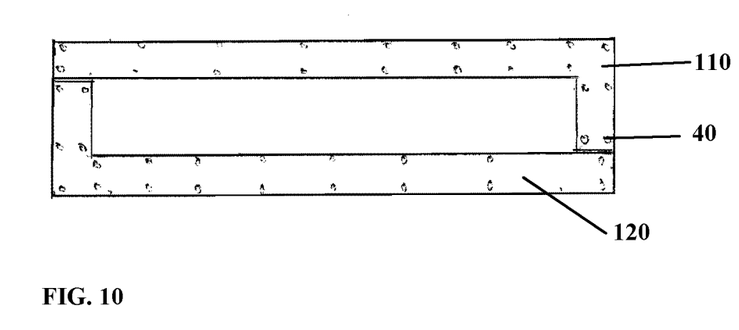
FIG. 10 depicts an embodiment of a device wherein the template member comprises two pieces, or alternatively, depicts two different template members.

FIG. 10 depicts an embodiment wherein the template member comprises two pieces 110 and 120, or alternatively, depicts two different template members 110 and 120. In some embodiments, the magnetic component may comprise a number of solid magnets 40. These two pieces or template members may be adjusted with respect to one another to form an adjustable pattern of outer edges and/or window components for cutting sheet metal.

Figure 11A:
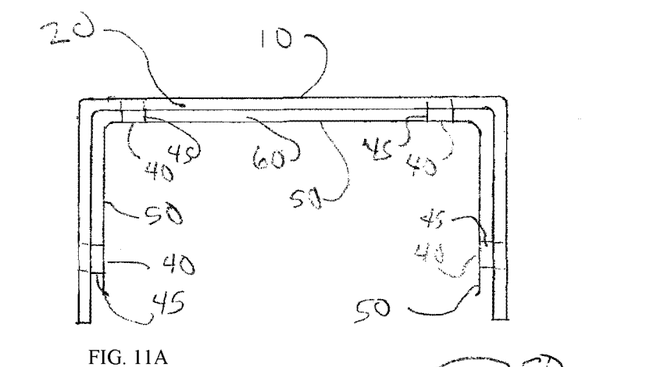
FIGS. 11A and 11B depict an embodiments of a device which may be useful in cutting a metal stud.
Figure 11B:
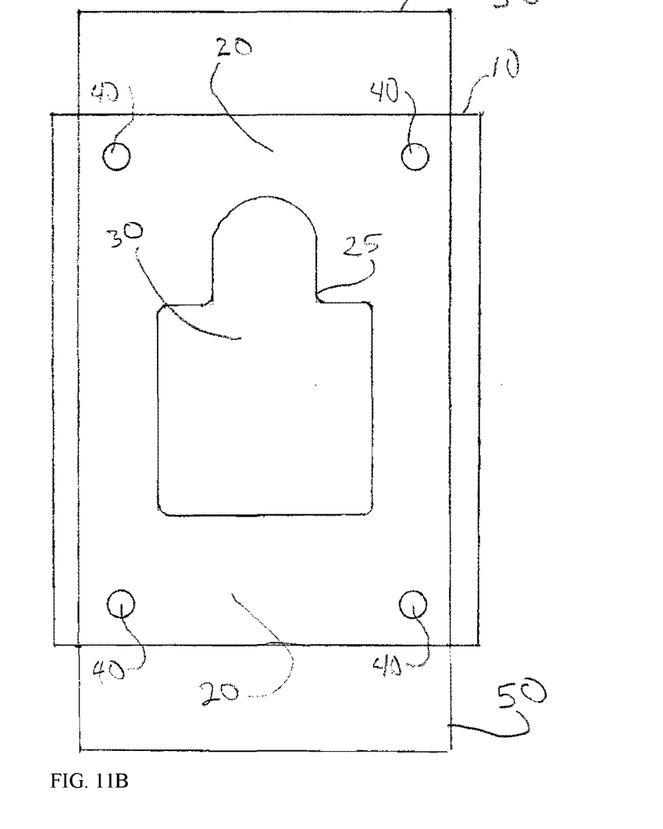

FIG. 11 depicts and embodiment which may be useful to cut a metal wall stud. For example, the template member 10 is shaped to wrap around three sides of a metal stud, as shown in the end view (FIG. 11A). The cut out component 20, has an area devoid of the solid component 30. When the window component 20 is used as a guide for cutting a metal wall stud, the portion cut out of the metal wall stud allows metal reinforcement rods to be placed in the stud, as shown in the top view (FIG. 11B). The solid component 20, window component 25, solid magnets 40, spacing members 40, metal surface 50, and space 60 between the surface 15 of the solid component and the metal surface 50, in their particular non-limiting forms associated with this embodiment are also depicted.

These embodiments demonstrate the large variety of shapes and patterns that may be cut in sheet metal by varying the shape of the template member, or by combining one or more template members.

These devices may be fabricated by any of a number of methods known in the art. In some embodiments, a flexible magnetic material may be cut as desired to form the device. In other embodiments, a rigid or flexible material such as PVC may be cut as desired to obtain a template member with the window component or outer edge desired. Holes may then be cut or drilled in the template material which are slightly smaller than one or more solid magnets. The solid magnets may then be forced into the holes so that they are either completely embedded, or partially embedded and partially protruding to form one or more spacing components. In some embodiments, the magnets and/or spacing members may be glued or otherwise affixed to the solid substrate material. Thus, there are a large number of methods known to those skilled in the art that may be employed to fabricate the devices described herein.

What is claimed is:

1. A device suitable for assisting the cutting of sheet metal comprising:
   a template member comprising a solid substrate material;
   a window component of the template member, comprising a pattern characterized by an area devoid of the solid substrate material, and a boundary around the area defined by the solid substrate material of the template member;
   a magnetic component, coupled to the template member in a fixed, non-adjustable, position with respect to the template member; and
   wherein the device is configured so that the boundary of the window component may be used as a guide for cutting sheet metal with a plasma cutter;
   wherein the device is configured so that the magnetic component provides a magnetic field of sufficient strength to allow the template member to be attached to the sheet metal, so that the boundary of the window component may be effectively used as a guide for cutting the sheet metal with a plasma cutter;
   wherein the device is configured so that the magnetic component provides a field which is sufficiently weak to allow the device to be effectively removed from the sheet metal without substantially damaging the template member or the sheet metal.

2. The device of claim 1, further comprising at least three spacing members, configured to contact the sheet metal, and coupled to the template member wherein the device is configured so the spacing members have a thickness which, when disposed between the template member and the sheet metal, is effective to reduce damage to the template member which would otherwise be caused by cutting the sheet metal with a plasma torch.

3. The device of claim 1, wherein the solid substrate material has a thickness of about 1/8 inch.

4. The device of claim 1, wherein the solid substrate material is a polymeric or a metallic material.

5. The device of claim 1, wherein the solid substrate material is PVC.

6. The device of claim 5, wherein the PVC has a thickness of about 1/16 inch to about 1/2 inch.

7. The device of claim 1, wherein the magnetic component comprises at least 3 solid magnets.

8. The device of claim 1, wherein the magnetic component has a pull force of from about 1 pound to about 200 pounds.

9. The device of claim 1, wherein the magnetic component has a pull force of from about 10 pounds to about 100 pounds.

10. The device of claim 1, wherein the magnetic component has a pull force of from about 40 pounds to about 60 pounds.

11. The device of claim 1, wherein the magnetic component comprises about 3 to about 200 neodymium magnets.

12. The device of claim 2, wherein the thickness of the spacing members is in a range of about 1/32 inches to about 1 inch.

13. The device of claim 2, wherein the thickness of the spacing members is in a range of about 1/16 inches to about 1/4 inch.

14. The device of claim 2, wherein the magnetic component comprises at least 3 solid magnets, and wherein a portion of each of at least 3 of the solid magnets are partially embedded into the template member at a single surface and partially protrude from that surface, wherein at least some of the spacing members comprise the portion of each magnet which protrudes from the surface of the template member.

15. The device of claim 1, wherein:
   the template member comprises PVC having a thickness of about 1/8 inch, the magnetic component comprises from about 4 to about 12 solid magnets, each solid magnet having a pull force in the range of about 6 pounds to about 7 pounds;
   at least 3 of the solid magnets are partially embedded into the template member at a single surface and partially protrude from that surface;
   at least some of the spacing members comprise the portion of the magnet which protrudes from the surface of the template member;
   the thickness of the spacing members is in the range of about 1/16 inch to about 1/4 inch; and
   the pattern is a triangle, an oval, a circle, or a rectangle.

16. The device of claim 1, wherein the pattern is a polygon, an oval, or a circle.

17. A method of cutting sheet metal comprising:
   providing the device of claim 1;
   affixing the device to the sheet metal, wherein the spacing members contact the sheet metal;
   cutting the sheet metal using a plasma cutter, and using the boundary of the window component as a guide for the plasma cutter; and
   removing the device from the sheet metal.

18. The method of claim 17, wherein:
   the template member comprises PVC having a thickness of about 1/16 to 1/4 inch, the magnetic component comprises about 3 to about 25 solid magnets, each solid magnet having a pull force in the range of about 3 pounds to about 10 pounds;
   at least 3 of the solid magnets are partially embedded into the template member at a single surface and partially protrude from that surface;
   at least some of the spacing members comprise the portion of the magnet which protrudes from the surface of the template member;
   the thickness of the spacing members is in the range of about 1/16 inch to about 1/4 inch; and
   the pattern is a triangle, an oval, a circle, or a rectangle.

19. A device suitable for assisting the cutting of sheet metal comprising:
   a template member comprising a solid substrate material having an outer edge; and
   a magnetic component, coupled to the template member in a fixed, non-adjustable, position with respect to the template member;
   wherein the device is configured so that the outer edge may be used as a guide for cutting the sheet metal with a plasma cutter;
   wherein the device is configured so that the magnetic component provides a magnetic field of sufficient strength to allow the template member to be attached to the sheet metal so that the outer edge may be effectively used as a guide for cutting the sheet metal with a plasma cutter; and
   wherein the device is configured so that the magnetic component provides a field which is sufficiently weak to allow the device to be effectively removed from the sheet metal without substantially damaging the template member or the sheet metal.

20. The device of claim 19, wherein the template component is a flexible PVC.

* * * * *